United States Patent [19]

Abouzakhm

[11] Patent Number: 4,961,385
[45] Date of Patent: Oct. 9, 1990

[54] AUTOMATED TRANSPORTATION SYSTEM

[76] Inventor: Elie S. Abouzakhm, 7656 Shaughnessy Street, Suite 6, Quebec, Montreal, Canada, H2A 1K4

[21] Appl. No.: 416,508

[22] Filed: Oct. 3, 1989

[51] Int. Cl.⁵ .............................................. B61B 7/00
[52] U.S. Cl. ..................................... 104/113; 104/117
[58] Field of Search ............... 104/113, 164, 112, 117; 254/277; 212/75, 76, 184, 185, 71, 124, 134; 414/336, 671

[56] References Cited

U.S. PATENT DOCUMENTS

| | | | |
|---|---|---|---|
| 403,603 | 5/1889 | Newcomb | 212/75 |
| 780,966 | 1/1905 | Abelson | 104/113 |
| 1,019,984 | 3/1912 | McGee | 212/75 |
| 1,422,032 | 7/1922 | Chapman | 104/23.1 |
| 1,550,140 | 8/1925 | Bennington | 104/94 |
| 1,583,350 | 5/1926 | Guischard | 104/113 |
| 2,135,244 | 11/1938 | Uyehara | 414/560 |
| 3,537,597 | 11/1970 | Barns | 212/75 |
| 3,831,526 | 8/1974 | Howells et al. | 104/121 |
| 4,470,355 | 9/1984 | Kunczynski | 104/196 |

FOREIGN PATENT DOCUMENTS

| | | | |
|---|---|---|---|
| 0392679 | 12/1922 | Fed. Rep. of Germany | 104/113 |
| 0787222 | 12/1980 | U.S.S.R. | 104/117 |
| 1168938 | 10/1969 | United Kingdom . | |

*Primary Examiner*—Andres Kashnikow
*Assistant Examiner*—Mark T. Le
*Attorney, Agent, or Firm*—H. Jay Spiegel

[57] ABSTRACT

An automated transportation system utilizes the force of gravity to propel vehicles along a system of cables. The cable may be manipulated through a hydraulic system to adjust their slope in a manner allowing vehicles to travel thereover in one direction or another. Savings in energy accrue through the use of the present invention which facilitate its use throughout the world.

31 Claims, 15 Drawing Sheets

AUTOMATED TRANSPORTATION SYSTEM

BACKGROUND OF THE INVENTION

The present invention relates to an automated transportation system. The inventive system uses down slopes made of cables having adjustable inclination in order to propel transportation vehicles through the use of the force of gravity.

Aerial tramway systems are known in the art. Such systems as cable car system and monorail systems have been used in cities and amusement parks. However, these devices are expensive to build and maintain, use great amounts of energy during their operation and require a great deal of maintenance. As such, a need has developed for an automated transportation system which is easy to design and build, inexpensive to operate and which requires little maintenance.

The following prior art is known to applicants:

U.S. Pat. No. 403,603 to Newcombe discloses a conveyor device wherein a carriage is moved on a cable, the angle of which may be adjusted with respect to the ground to provide gravity power. The present invention is different from the teachings of Newcombe for reasons including the fact that the present invention contemplates movement of a vehicle from station to station, not limited by support devices defining cable terminations as is the case in Newcombe.

U.S. Pat. No. 780,966 to Abelson discloses a gravity railway system wherein a vehicle 21 may be moved on cables 8 or 9 through adjustment of the angle of the cables with respect to the ground. The present invention differs from the teachings of Abelson as having a superior means for transferring the vehicle from station to station.

U.S. Pat. No. 1,019,984 to McGee discloses a gravity powered vehicle designed to move between stations on a cable 9. Again, the present invention differs from the teaching of McGee for reasons including the manner of transfer of the vehicle from station to station.

U.S. Pat. No. 1,422,032 to Chapman discloses an amusement device including a model airplane traveling on a cable. This patent is believed to be of only general interest concerning the teaching of the present invention.

U.S. Pat. No. 1,550,140 to Bennington is also believed to be of only general interest concerning the teachings of the present invention since the present invention contemplates the use of a flexible cable to support a vehicle whereas Bennington teaches the use of rail or beam.

U.S. Pat. No. 1,583,350 to Guischard discloses a conveyer toy wherein a cable spanning two points carries a toy vehicle. The present invention differs from the teaching of this patent as contemplating a device wherein transfer of a vehicle from station to station may be carried out in an effective manner.

U.S. Pat. No. 2,135,244 to Uyehara discloses a trolley conveyor designed to convey bundles from one location to another by a device carried on a cable. Again, there is no teaching or suggestion in Uyehara of transfer of a vehicle from station to station in the manner contemplated by applicant.

U.S. Pat. No. 3,537,597 to Barnes discloses a cable conveyor designed to carry an article from one location to another. Again, there is no contemplation in this patent of transfer of the device from station to station in a manner disclosed in the present invention.

U.S. Pat. No. 3,831,526 to Howells et al. discloses a viaduct for small powered passenger vehicles wherein each vehicle includes an elongated rod attachable over a rail to guide the vehicle. The present invention differs from the teachings of this patent as contemplating a cable system wherein transfer of a vehicle from station to station is contemplated.

U.S. Pat. No. 4,470,355 to Kunczynski discloses a pneumatic cable tensioning apparatus and method for an aerial tramway or the like. This patent contemplates tensioning in an endless cable contemplated for use, for example, in a ski lift. This patent is believed to be of only general interest concerning the teachings of the present invention.

British Patent Specification 1,167,938 discloses a self-propelled vehicle system for use in transfer of loads. The teachings of this document are believed to be of only general interest with regard to the present invention.

Soviet Union Document 787,222 discloses a railway cable tension mechanism designed to tension cable used in transporting a vehicle. This document is believed to be of only generally interest concerning the teachings of the present invention.

SUMMARY OF THE INVENTION

The present invention relates to an automated transportation system. The present invention includes the following interrelated aspects and features:

(a) In a first aspect, the inventive automated transportation system contemplates a plurality of sequential stations each station defined by a first column and a second column, with the second column of a first such station comprising the first column of a second such station.

(c) Each station includes hydraulic means provided to control the angle of a cable strung therebetween thereby facilitate control of both direction of movement of a vehicle and speed of movement thereof.

(d) Each vehicle consists of a passenger or merchandise compartment mounted on a trolley mechanism having pulleys which may be guidingly supported on the cable.

(d) Each station includes structure facilitating transfer of the vehicle from station to station. In particular, each pulley of the vehicle consists of two pulleys mounted side by side with a lateral spacing corresponding to a corresponding lateral spacing between cable sections at adjacent stations. When a vehicle arrives at a station, one set of these pulleys are supported on the cables. At the transfer point, the adjacent set of pulleys engage the section of cable forming a part of the next sequential station in a line of stations. The subsequent stations alternate in this manner so that in alternate stations, the pulleys on which the vehicle is supported reverse themselves back and forth.

(e) In the preferred embodiment of the present invention, a computer control system is employed to sense location of every vehicle within the system, thus best facilitating adjustments in the angle of the respective cables in the respective stations to thereby allow control of movement of vehicles from station to station. In one aspect, sensors are provided to sense that a vehicle has arrived adjacent respective stations with each sensor notifying a central control such as a computer of the location of the vehicle. Responsive to such sensing, the angle of various cable sections with respect to the ground surface may easily be adjusted through the hydraulic means mentioned above to control starting, stopping and other movements of the respective vehicles.

In a further aspect, structure may be provided to allow vehicles to be lowered to the ground off the cable and to be raised back up to the cable.

As such, it is a first object of the present invention to provide an automated transportation system.

It is a further object of the present invention to provide such an automated transportation system including the provision of a plurality of sequential stations on which a vehicle may travel from station to station.

It is a further object of the present invention to provide such a system which will save energy as well as expense and construction.

It is a yet further object of the present invention to provide such a system including a unique means for transferring vehicles between stations.

These and other object, aspects and features of the present invention will be better understood in the following detailed description of the preferred embodiments when read in conjunction with the appended drawing figures.

SPECIFIC DESCRIPTION OF THE PREFERRED EMBODIMENT

Figure 1:
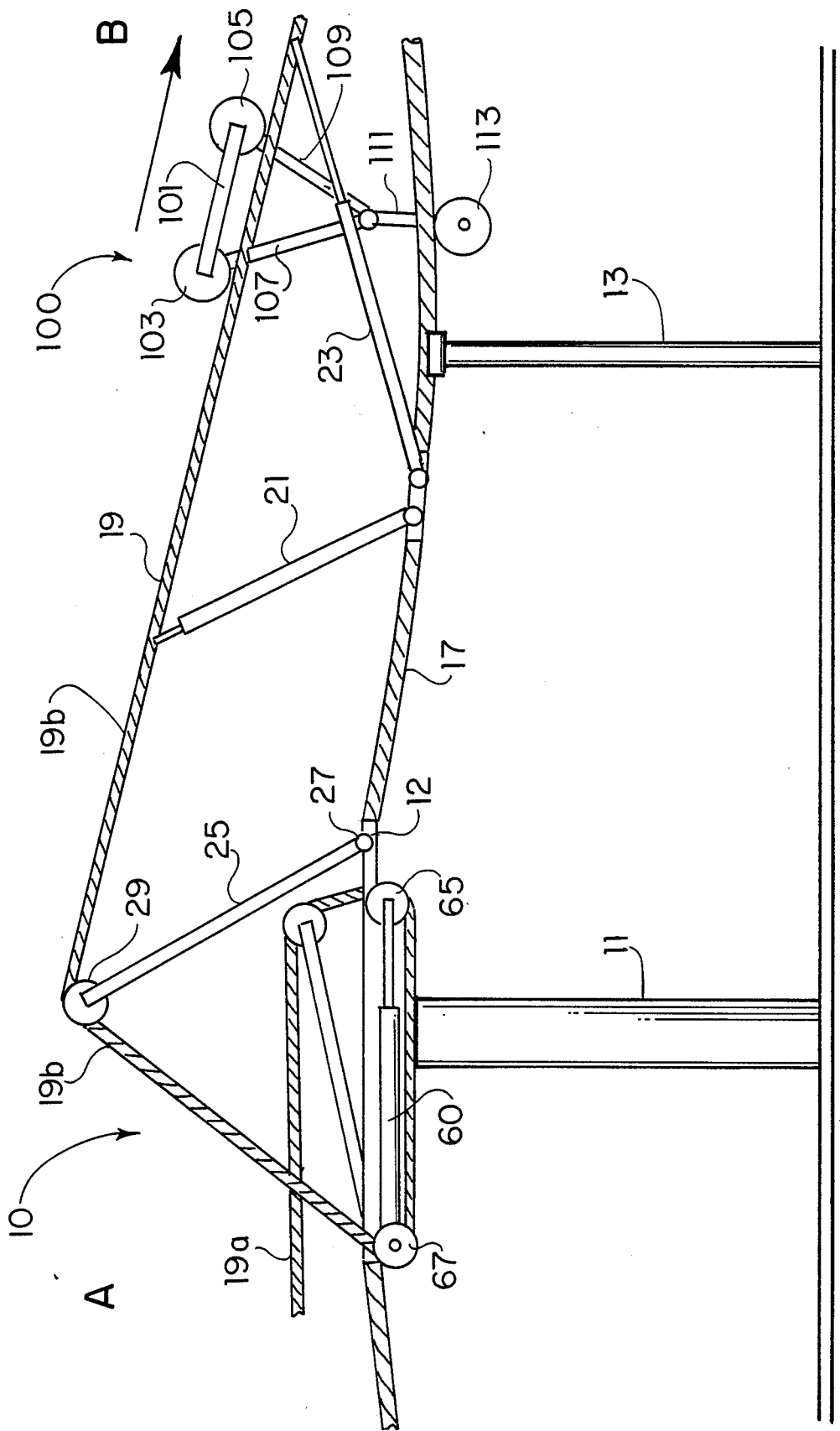
FIG. 1 shows a side schematic representation of a portion of the inventive system, showing one station and a portion of the system in a direction toward the next station.

With reference, first, to FIGS. 1–3, and 22–25, the present invention is generally designated by the reference numeral 10 and is seen to include vertical supports 11, 13 and 15. Of course, these figures only depict a portion of the entirety of the system, since it is intended that the inventive automated transportation system may be used to support and control the movements of a vehicle or vehicles over a long distance. In fact, several supports 13 may be provided between each pair of supports 11, 15.

Supported on the supports 11, 13 and 15 are a lower cable 17 and an upper cable 19, which cables may if desired be covered with a thin layer of stainless steel to allow the vehicle to achieve a great speed on a low friction track. The supporting means comprises two supports 21 and 23 each comprising two or more hollow telescoping tubes devoid of fluid and designed to extend and retract gently under pressure placed on the ends thereof. In their extended positions, they are unable to support any associated structure. However, when they are completely retracted and standing upright or substantially upright, they may support the cable 19 in a safe and effective manner. In the position shown in FIG. 1, the support 23 does not provide any weight bearing function. However, the support 21 being retracted and generally vertical supports the weight of the cable 19 and the vehicle 100 under it thereon.

Figure 2:
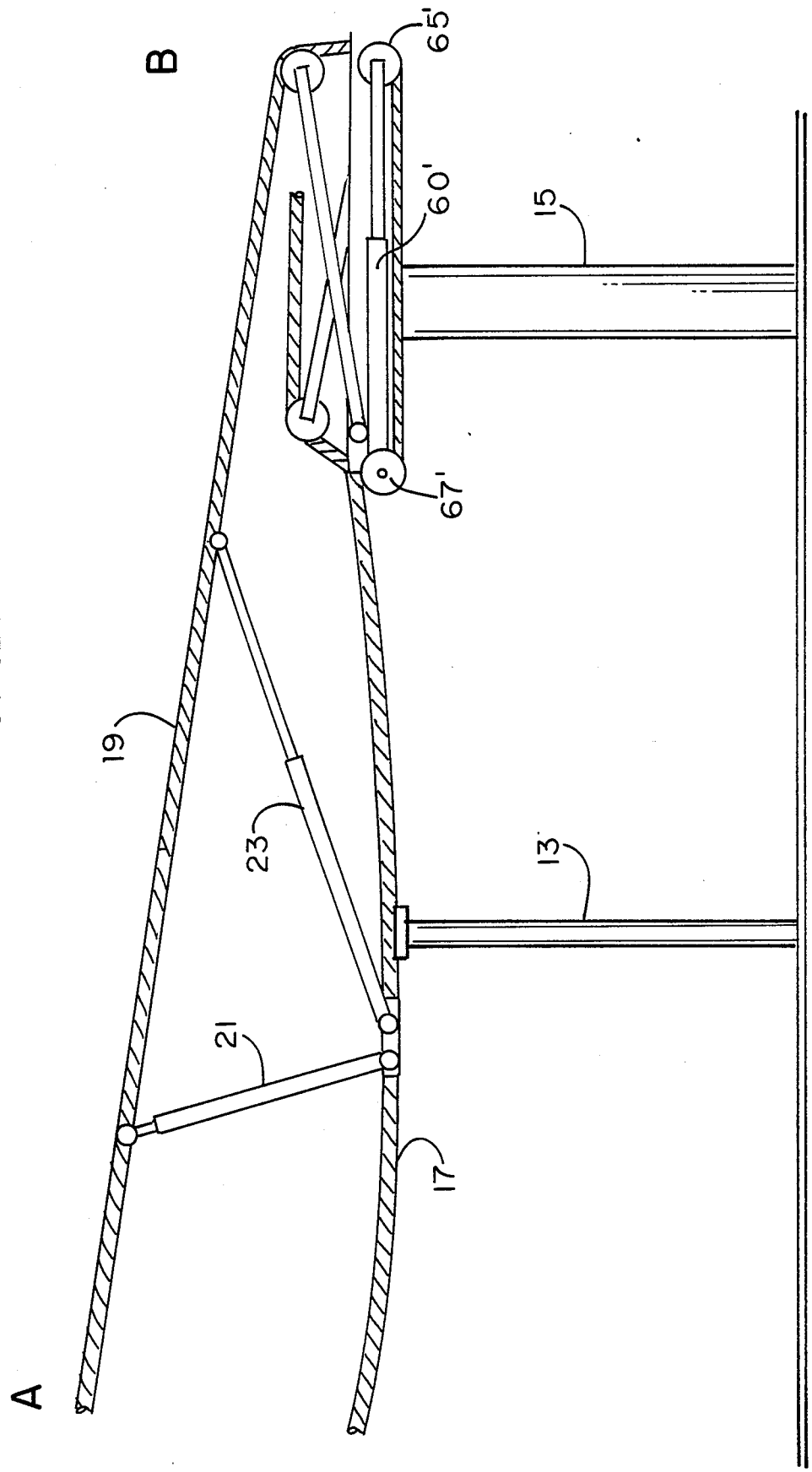
FIG. 2 shows a schematic representation of a second station and a portion of the system continuing from the view of FIG. 1 and terminating at the next station.

With reference to FIG. 2, a similar situation exists, with the support 21 supporting the cable 19 and the vehicle 100, while the support 23 is extended and performs no weight bearing function.

Figure 22:
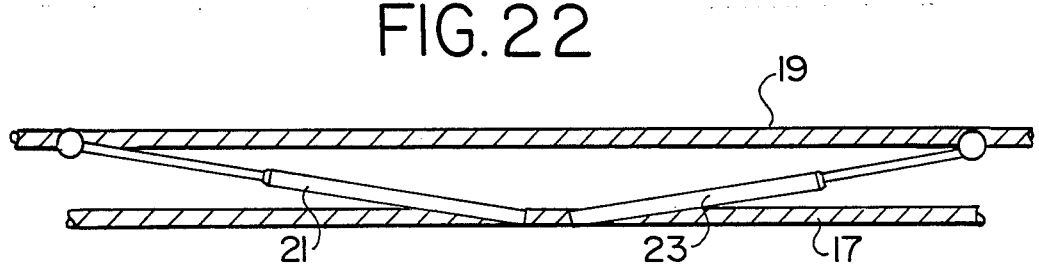
FIGS. 22–25 show the relationship between the supports 21, 23 and the cables 17, 19 in various orientations thereof.
Figure 23:
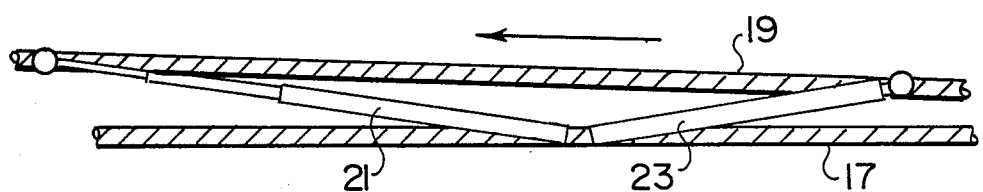
Figure 24:
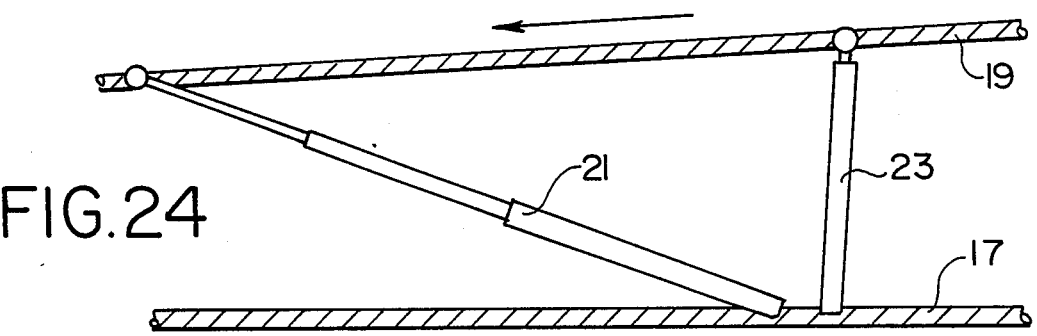

FIG. 22 shows the cable 19 and the cable 17 in a resting position with both the supports 21 and 23 being extended and, thus, not performing any support function. In FIG. 23, a slight slope upwardly from right to left in view of the figure is being created by operation of a cable tensioning ram 60 (not shown in FIG. 23). In the view of FIG. 23, the support 21 has extended while the support 23 has retracted to a position where it will support the cable 19 when pivoted to a generally upright configuration. FIG. 24 shows the generally upright configuration of the support 23 wherein support of the cable 19 thereby is possible. The extension of the support 21 precludes its being able to support the cable 19.

Figure 25:
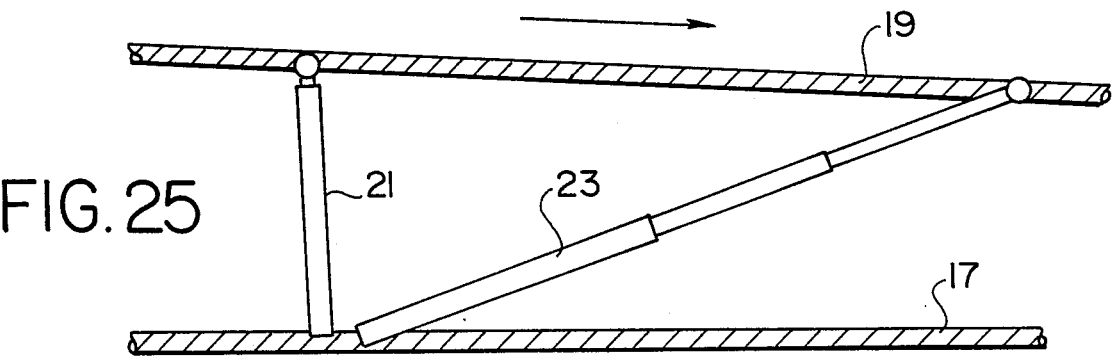

FIG. 25 shows the reverse of the situation of FIG. 24 wherein the support 21 supports the cable 19 and the support 23 has extended due to the particular orientation of the cable 19 with respect to the cable 17, but the support 23 performs no supporting function.

Figure 8:
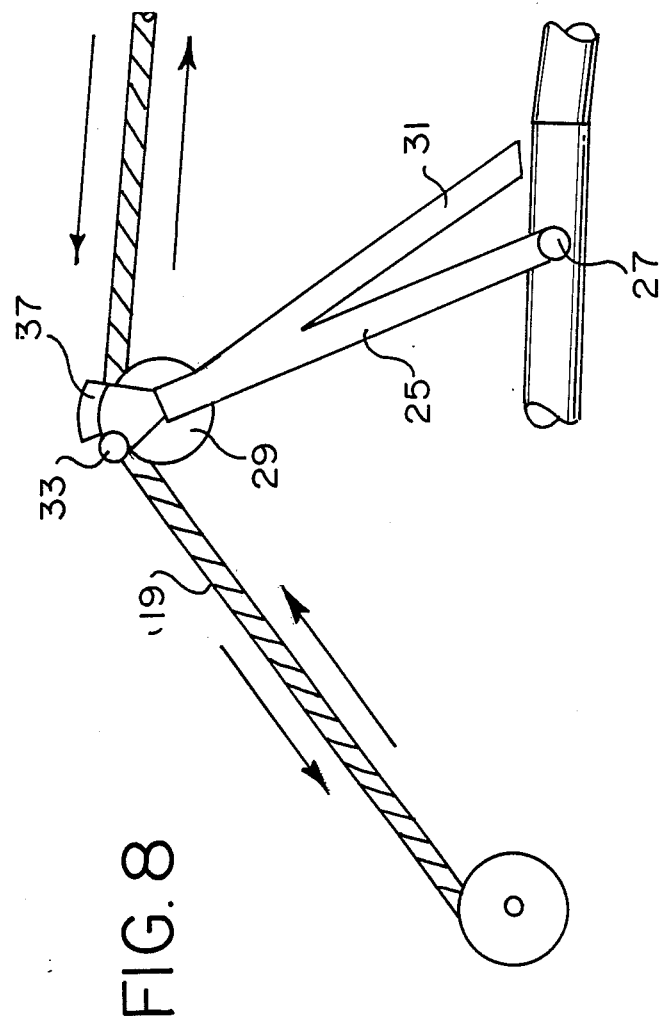
FIG. 8 shows a portion of the structure of the present invention at a station in an elevated position.
Figure 9:
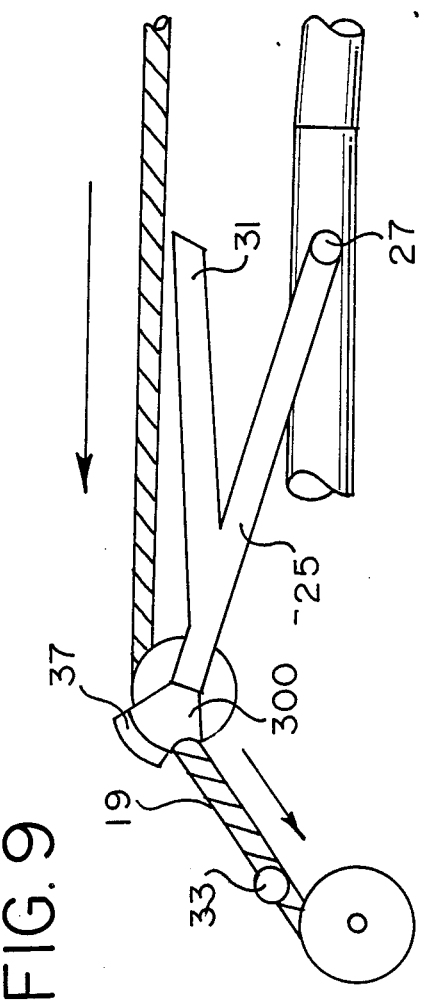
FIG. 9 shows the same structure shown in FIG. 8 but in a lowered orientation.
Figure 10:
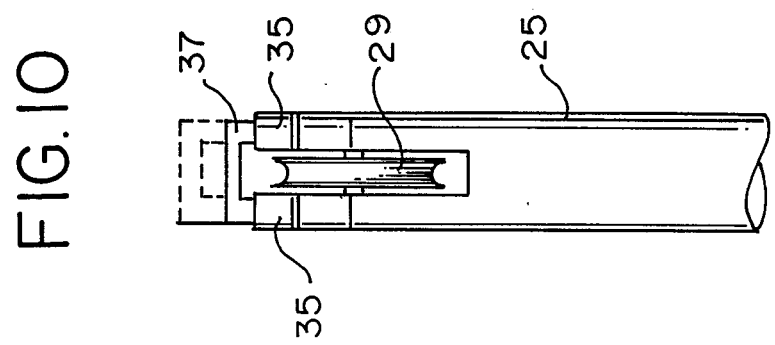
FIG. 10 shows an end view of a portion of the structure shown in FIGS. 8 and 9.

With particular attention to FIG. 1, a bar 25 includes a pivot 27 allowing pivoting movements with respect to the lower cable 17 and includes an upper pulley 29 over which the upper cable 19 is supported. With particular reference to FIGS. 8–10, it is seen that the support 25 may include a second leg 31 which bears against the lower cable 17 when the support 25 has been pivoted to the position shown in FIGS. 1 and 8.

With further reference to FIGS. 8 and 9, it is seen that a protrusion 33 is provided on the cable 19 which is designed to be caught between two upstanding portions 35 of the support 25 as best seen in FIG. 10. When the protrusion 33 is so caught between the upstanding portions 35, this will cause the support 25 to pivot upwardly from the position shown in FIG. 9 to the position shown in FIG. 8 to thereby cause the system to assume the orientation shown in FIGS. 1–3.

In a further aspect, with reference to FIGS. 8–10, a sensor 37 is mounted between the upstanding portions 35 of the support 25 and, as best seen in FIG. 10, may reciprocate from a resting position shown in phantom in FIG. 10 to a depressed position also shown in FIG. 10, which depressed position is caused by a wheel of the associated vehicle rolling thereover. The sensor 37 comprises a switch which, when depressed, sends an electrical signal to a control station to notify the control station of the location of a vehicle and its speed, by calculating the time needed for the vehicle to get from one sensor to the other.

In a further aspect, a recess 300 best seen in FIG. 9 is provided on the end of the support 25 remote from the pivot 27. This recess 300 is sized and configured so that when the cable 19 is pulled in the left-hand direction in the view of FIGS. 8 and 9, the protrusion 33 will be caught within the recess 300 to commence pivoting of the support in the counterclockwise direction in the view of FIGS. 8 and 9. As the rotation of the support 25 in the counter-clockwise direction continues, eventually, the protrusion 33 will be released from the recess 300 as shown in FIG. 9.

Figure 3:
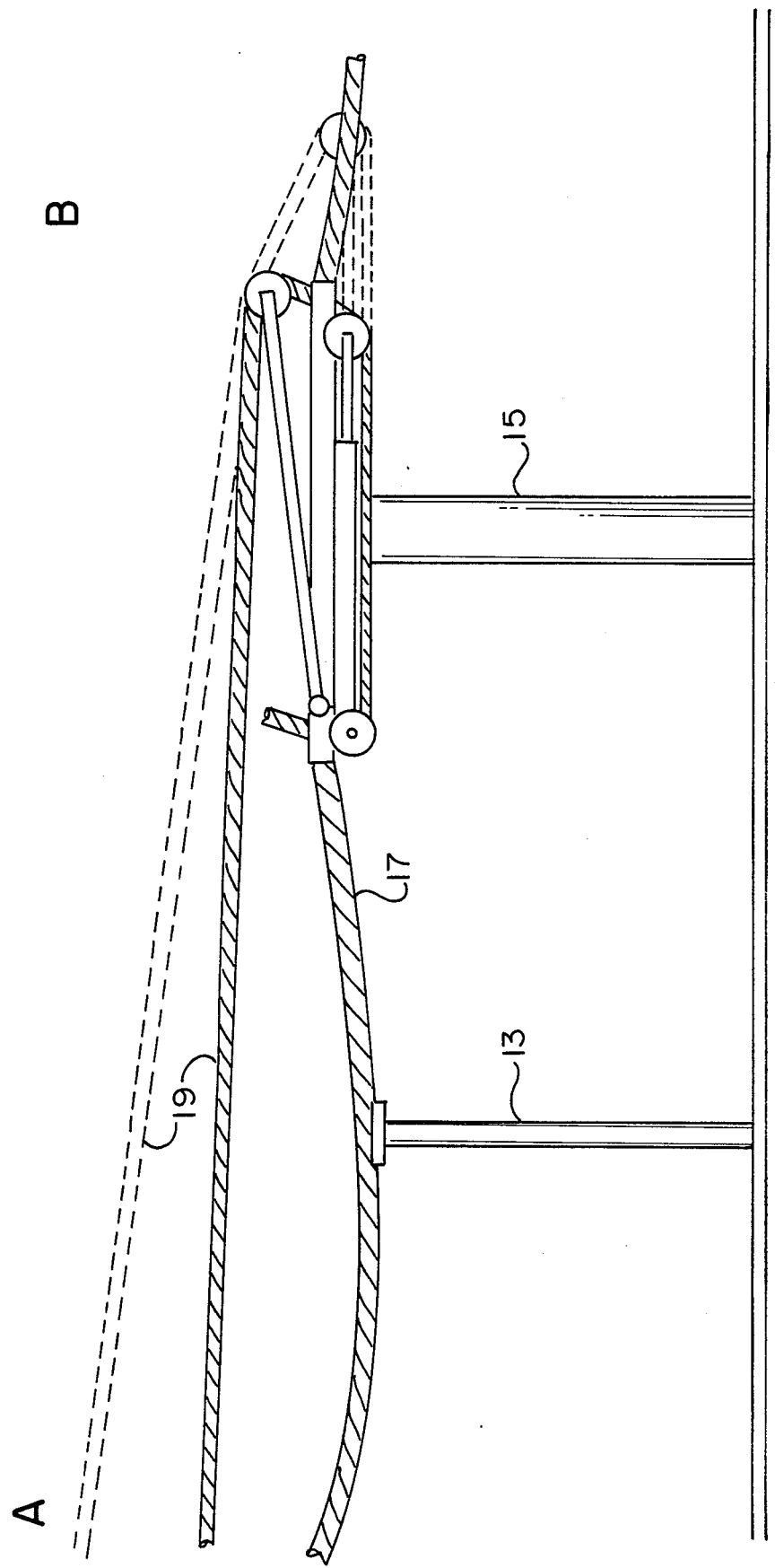
FIG. 3 is similar to FIG. 2 but shows a different orientation of parts.
Figure 4:
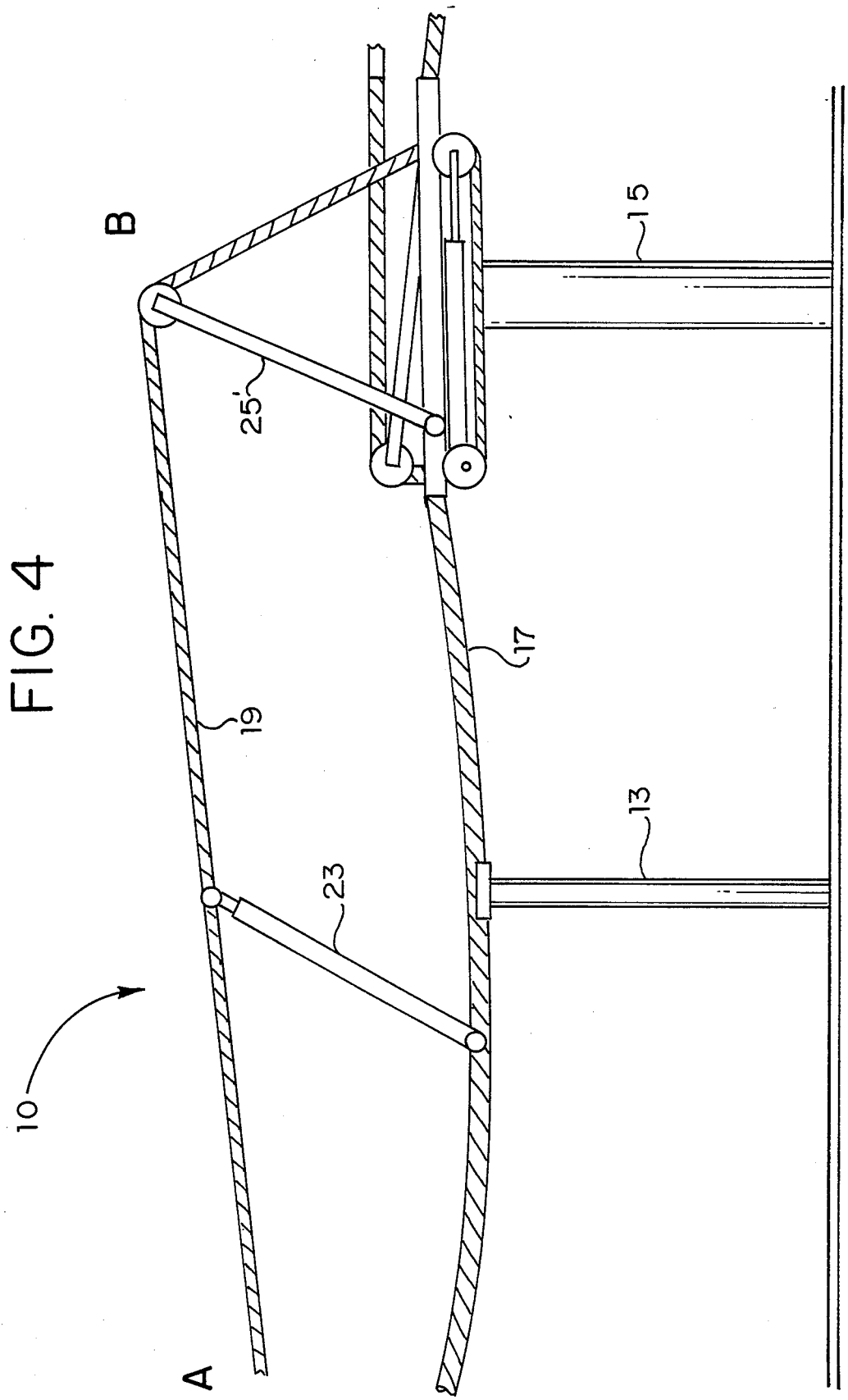
FIG. 4 shows a schematic representation of the second station shown in FIGS. 2 and 3, but with a different orientation of parts causing reversal in the direction of movement of a vehicle.
Figure 5:
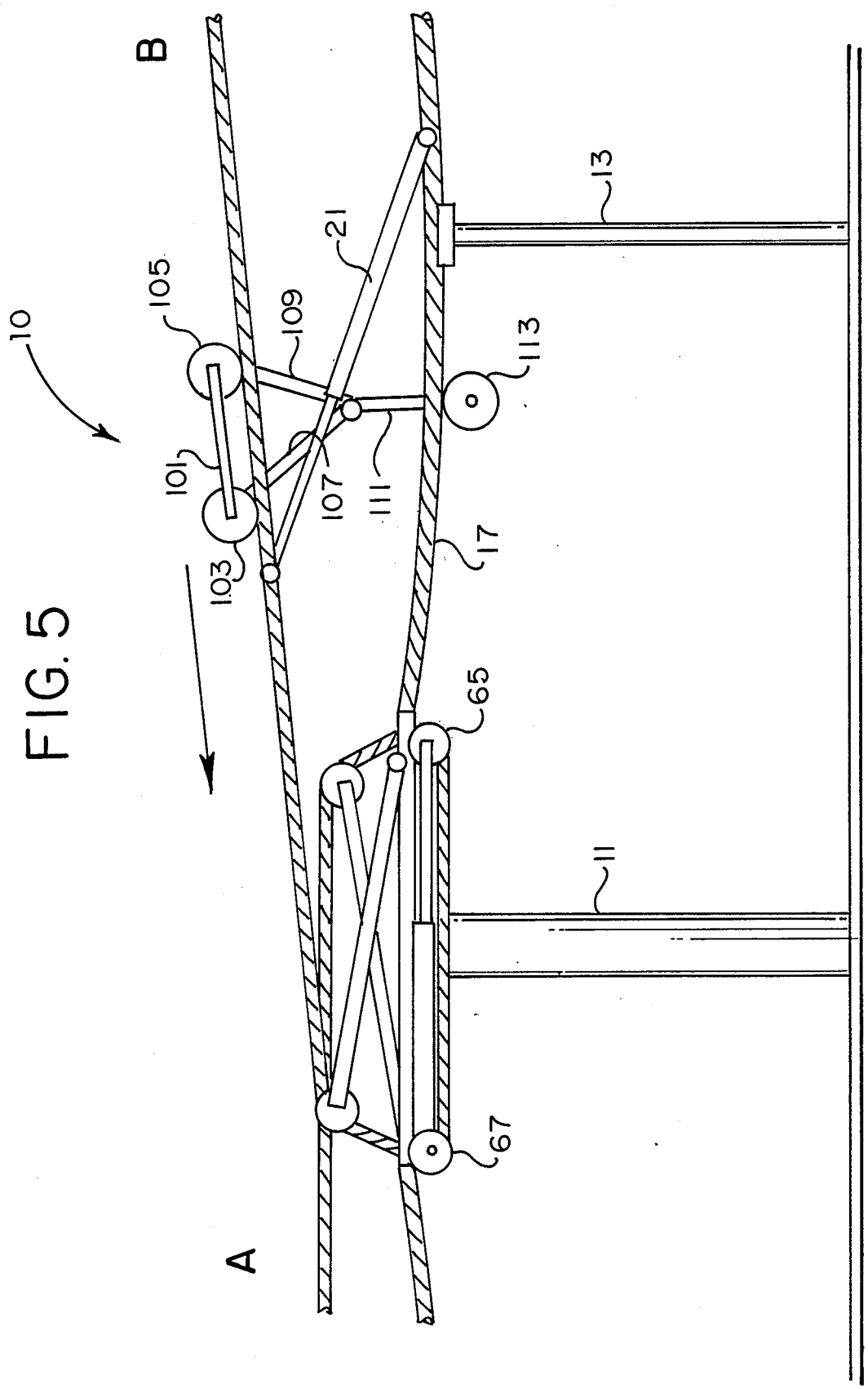
FIG. 5 shows a continuation of the view of FIG. 4 showing the first mentioned station depicted in FIG. 1, but with a different orientation of parts allowing the reversal of direction of a vehicle.

FIGS. 4 and 5 show the inventive system with the angle of the upper cable 19 being reversed with respect to its direction of orientation shown in FIGS. 1–3. With reference back to FIGS. 1–3, these figures depict an orientation of the system 10 promoting movement of a vehicle in the direction from A to B. The orientation of the system depicted in FIGS. 4 and 5 promotes movement of a vehicle in a direction from B to A.

Figure 15:
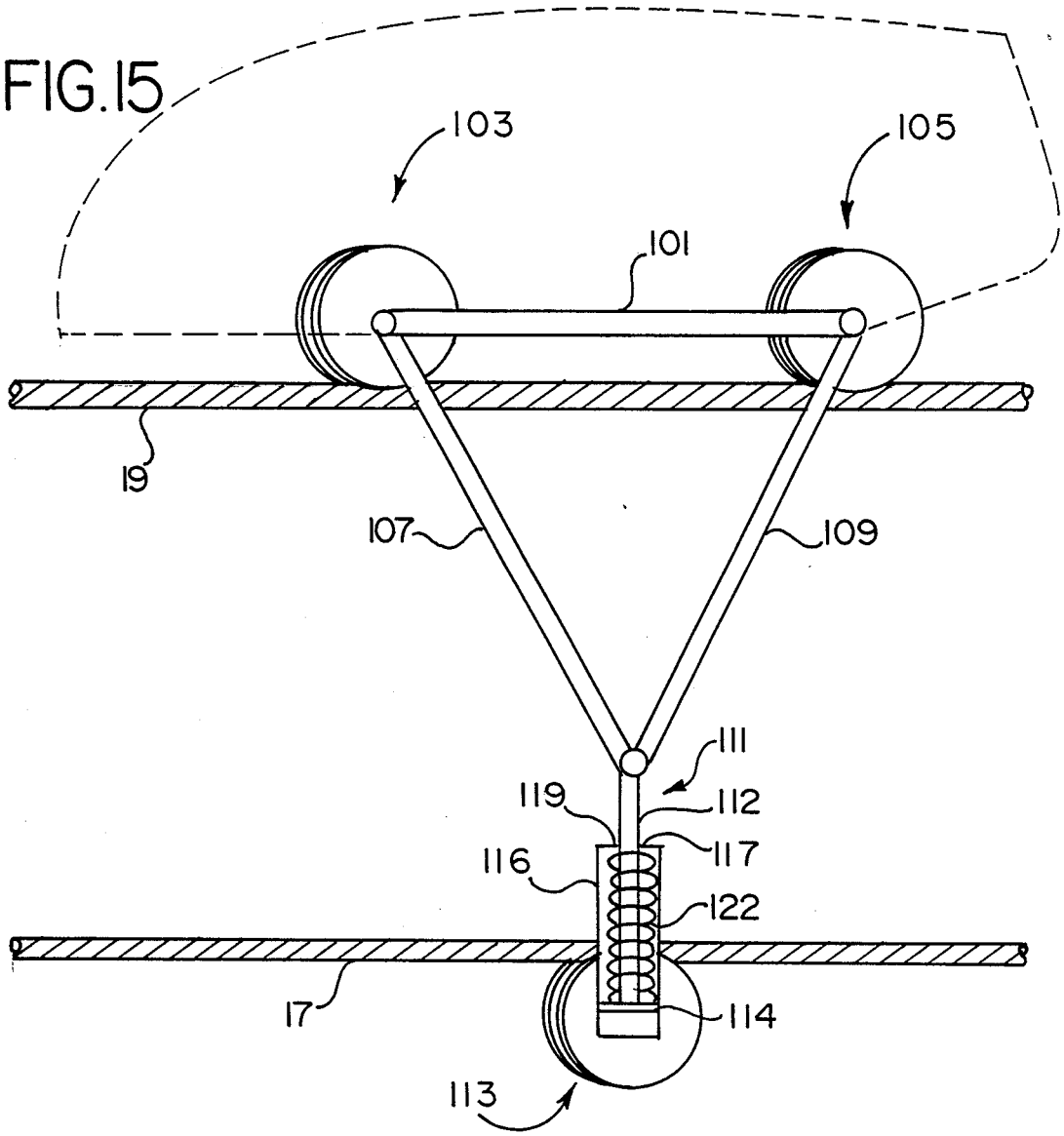
FIG. 15 shows a side view of the wheeled supports for a vehicle and a manner of coupling on the cable system.

With reference to FIG. 15, a vehicle 100 is shown only schematically in terms of its interengagement with the cables 17, 19. The vehicle is seen to include a carriage 101 which supports first and second wheel portions 103, 105 and which further supports support members 107, 109 which connect to a further telescoping support 111 which supports a further wheel 113.

Figure 16:
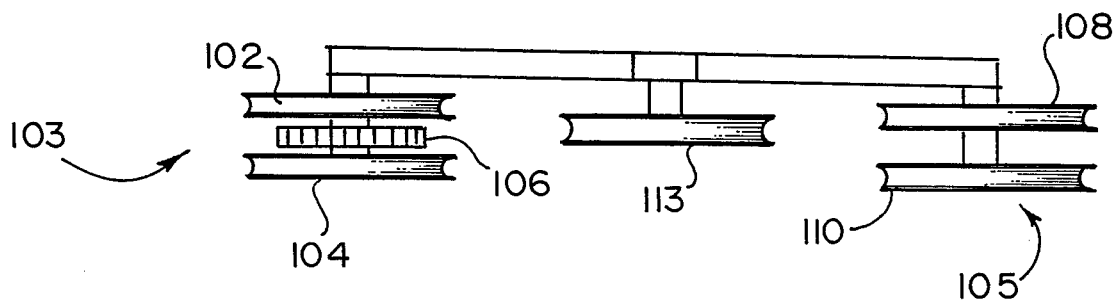
FIG. 16 shows a top view of the wheels and associated structure of a vehicle forming a part of the present invention.

With particular reference to FIGS. 15 and 16, it is seen that the wheel portion 103 includes two spaced wheels 102 and 104 having a gear mechanism 106 mounted therebetween. The wheel portion 105 includes wheels 108 and 110.

In a further aspect, with particular reference to FIG. 15, the telescoping support 111 is seen to include a shaft 112 having an enlarged end 114 slidably mounted in a sleeve 116 having an opening 117 restricted by inwardly extending portions 119. The sleeve 116 rotatably carries the wheel 113, and a spring 122 biased between the portions 119 of the sleeve 116 and the protrusion 114 of the stem 112 resiliently biases the wheel 113 in the upward direction in the figures. This interconnection allows adjustment of the distance between the wheel 113 and the wheel portions 103, 105.

In a further aspect the wheels 102, 104 on the one hand and the wheels 108, 110 on the other hand are provided to allow transfer of the vehicle 100 from station to station.

Figure 6:
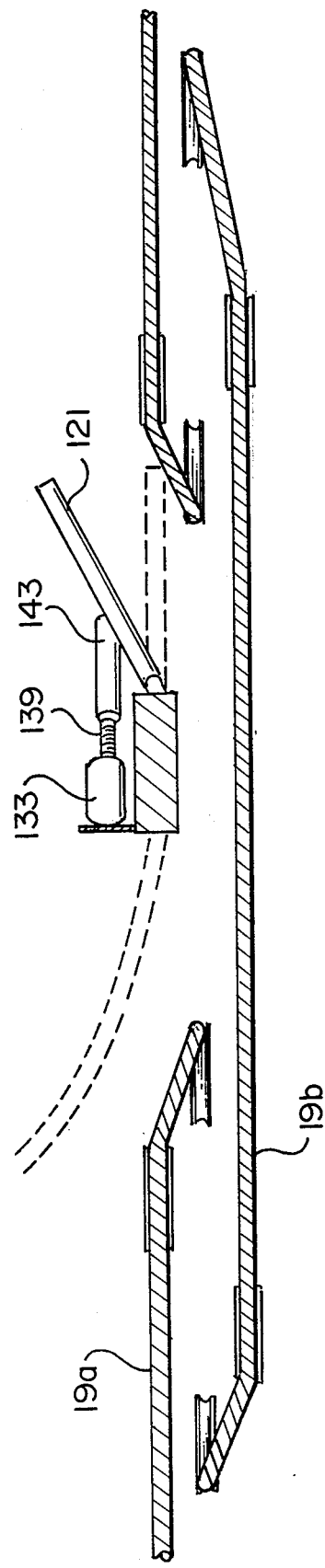
FIG. 6 shows a top view of two runs of cable at a station, depicting the manner of transference of a vehicle from one run to another.

Further, in this regard, reference is made to FIGS. 1 and 6. With reference to FIG. 1, the cable 19 is seen to include sections 19a and 19b. These sections are also shown in FIG. 6. The lateral staggering between these sections, means, for example, the wheels 104, 110 are not able to always support the vehicle at all stations and therebetween. Thus, with reference to FIGS. 1, 6 and 16, it should be understood that on the cable portion 19a, the wheels 102, 108 may engage the cable section 19a, whereas when the vehicle 100 arrives at the stretch of cable designated by the reference numeral 19b, the wheels 104, 110 will engage the cable section 19b leaving the wheels 102 and 108 disengaged therefrom. At the next subsequent station, the wheels 104, 110 will be disengaged and the wheels 102, 108 will be re-engaged.

Figure 18:
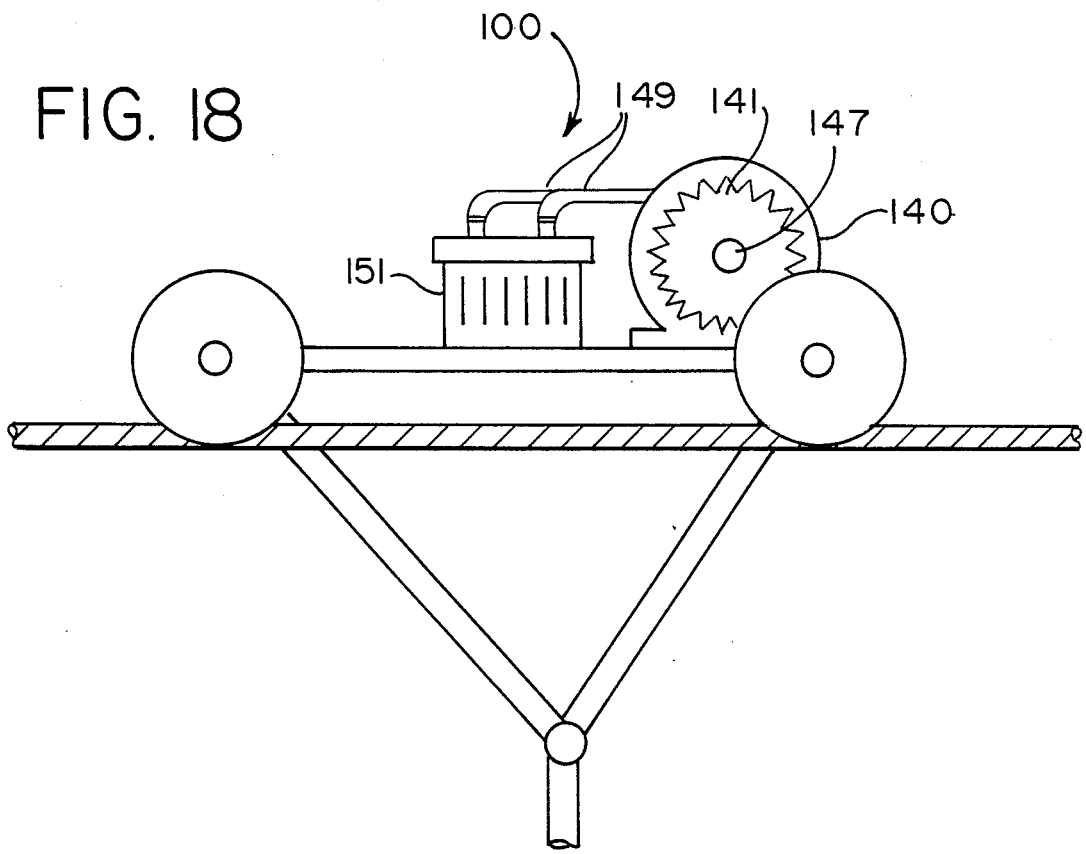
FIG. 18 shows generator structure which may be incorporated into the inventive vehicles.
Figure 19:
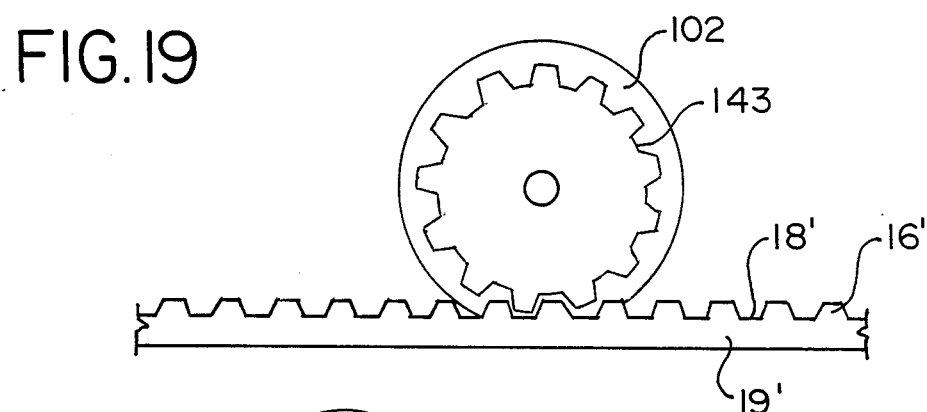
FIG. 19 shows a modification to the wheels of the inventive vehicle allowing lowering of the vehicle toward the ground from the cable and raising of the vehicle back up to the cable through the use of a toothed support.
Figure 20:
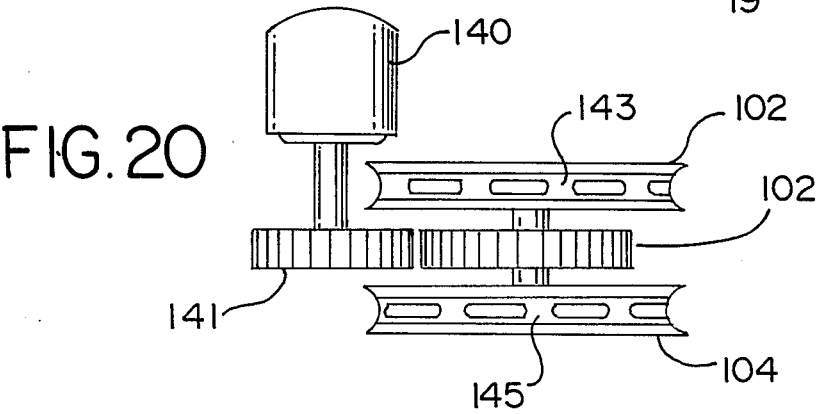
FIG. 20 shows a top view of the wheel structure shown in FIG. 19.

Referring back to FIG. 16, and considering FIG. 16 in conjunction with FIGS. 18–21, further aspects of the present invention will now be disclosed. The gear 106 shown in FIGS. 16 and 20 is provided to engage the generator in rotations accomplished at the same time as wheels 102 or 104 are rolling. The gear 106 is permanently engaged with the gear 141 so that electricity is produced during all rotations of the gear 106 caused by corresponding rotations of the wheel 102 or 104.

Figure 21:
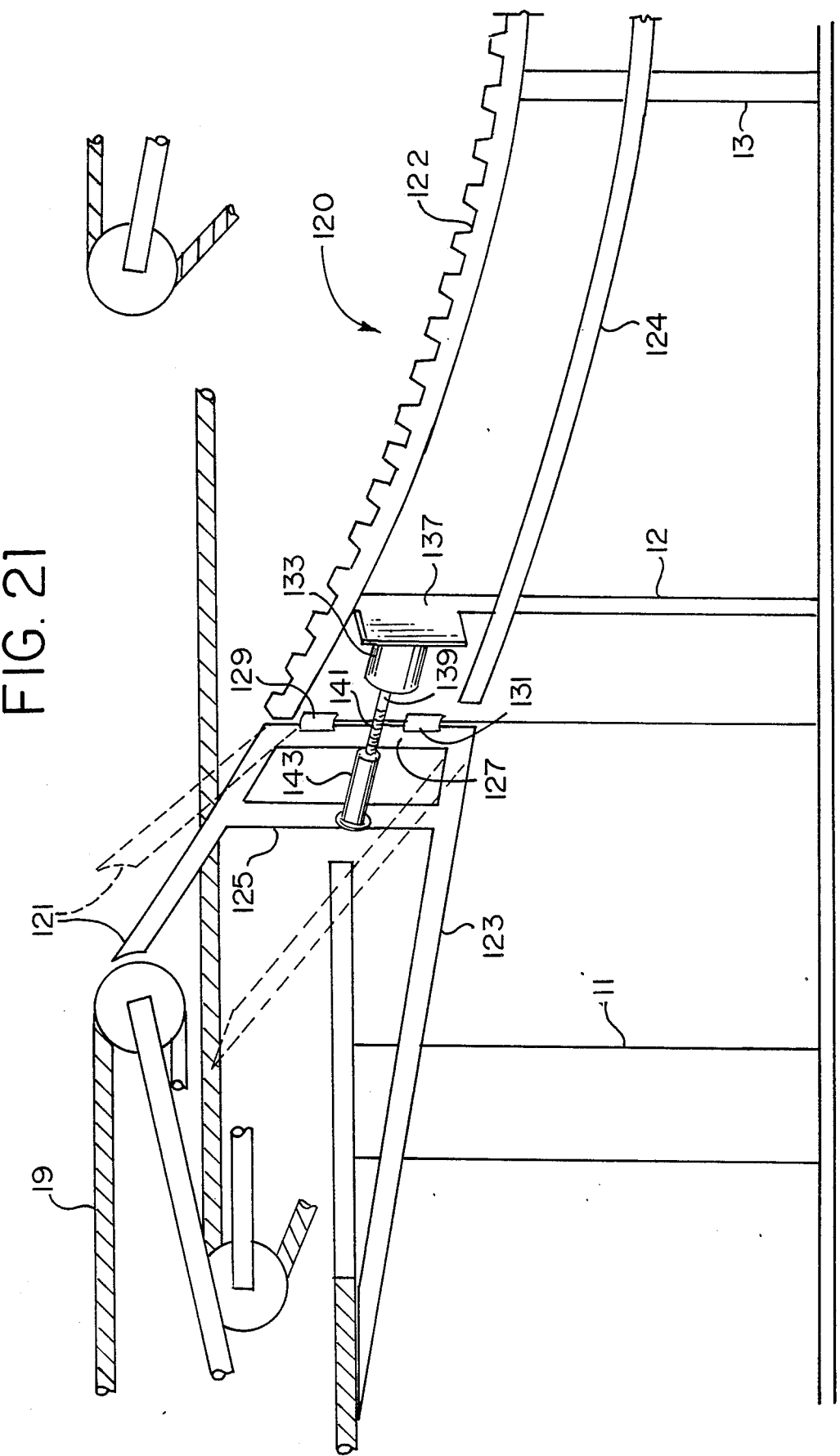
FIG. 21 shows a side view of an alternative embodiment of the present invention wherein the vehicles include the wheel structure shown in FIGS. 19 and 20 and the inventive vehicle may be lowered to the ground from the cable or may be raised back up to the cable.

With reference to FIG. 21, a tooth track 120 may be provided sloping downwardly from the cables 17, 19 toward the ground surface. A further support 12 is provided in this embodiment, which support 12 has pivotally mounted thereto two arms 121, 123, which are rigidly interconnected by virtue of vertical supports 125 and 127, and which assembly is pivotally mounted to the support 12 by the pivots 129, 131. A motor 133, is mounted on the support 12 by virtue of a mounting plate 137, with the motor shaft 139 having a threaded end 141 entering into a threaded coupling 143 affixed to the support 125. Thus, rotation of the motor 133 shaft 139 in one direction will cause pivoting movements of the arm 121, 123 in one direction, with rotative movements of the shaft 139 in the opposite direction causing corresponding opposite pivoting movements of the arms 121, 123. In the view of FIG. 21, the full line views of the arms 121, 123 show interception of the cables 17, 19 in a position allowing interception of the moving vehicle, with the wheel 113, thereof engaged in the underside of the arm 123, and with the wheels, for example 102, 108 engaging the arm 121. Thereafter, the wheel 113 engages the underside of the elongated bar 124. Using this system, the vehicle 100 may be lowered from the cables 17, 19 down to a station adjacent the ground.

Thereafter, it is necessary to raise the vehicle 100 back up to the cables 17, 19 so that the vehicle may continue its movement in a desired direction. However, movements of the vehicle 100 are accomplished through the force of gravity and thus, some means is required to provide motive force to raise the vehicle back up to the cables 17, 19.

With reference to FIG. 18, the vehicle 100 may be provided with a generator 140 having a gear 141 which may be interconnected with the gear 106 so that rotative movements thereof are transmitted to the gear 141 and thence to the generator 140 to generate electricity. The gear 141 is rigidly connected to a shaft 147 which extends into the housing of the generator 140 and rotates the generator rotor to thereby generate electricity. This electricity may be conducted by electrical conductors 149 to a storage battery 151 mounted on the vehicle 100 so that energy may be stored.

With reference to FIGS. 19 and 20, the wheels 102, 104 may be provided with recesses, 143, 145 respectively which create a geared configuration. The cable 19' may have recesses 18' therein and protrusions 16' designed to enmesh with the recesses 143, 145 in the wheels 102, 104. In this way, slippage between the wheels and the cable is avoided allowing positive interconnection therebetween ONLY if there is an uphill track or a downhill track to travel over by using the stored electricity to go uphill or by offering a frictional resistance on the wheels when traveling a very sharp, down slope. The toothed track 122 shown in FIG. 21 is an example of a track designed with teeth which may protrude into the wheel recesses 143, 145.

With the system as shown in FIGS. 18–20 being employed, with particular reference to FIG. 21, a vehicle may be sent, through the use of the device 120, to a ground station and, through storage of electricity in the battery 151, the generator 140 may be reversed to be used as a motor to propel the vehicle 100 back up the device 120 where it may restore coupling with the cable 19. After such restoration has taken place, the motor 133 may be activated to pivot the arms 121, 123 to the position shown in phantom in FIG. 21 thereby restoring the ability of the vehicle 100 to travel on the cables 17, 19.

FIG. 6 shows a top view of the embodiment of FIG. 21, showing the motor 133, shaft 139, sleeve 143 and support arm 121.

Figure 7:
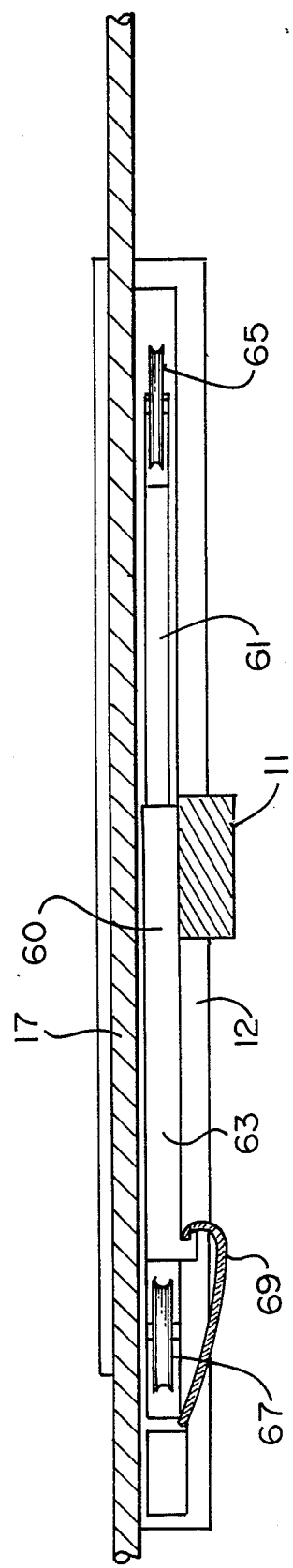
FIG. 7 shows a bottom view of a portion of the structure of the present invention connected to a lower cable thereof.

FIG. 7 shows the lower cable 17 which is rigidly connected to an elongated bar 12 designed to support various accessories for the system 10 such as, for example, the pivoting arm 25. In a further aspect, FIG. 7 shows adjustment means and tensioning means consisting of ram means description as a cable tensioning ram 60 also shown in FIG. 1, which ram includes piston rod 61 and piston (not shown) attached thereto and sliding in cylinder 63. This device includes pulleys 65, 67 at each end which are interconnected into the upper cable 19 as best shown in FIG. 1, with expansion and contraction of the ram 60 causing tensioning and relaxation, respectively, of the cable 19. The hydraulic line 69 controls supply and exhaust of fluid to and from the cylinder 63.

Figure 11:
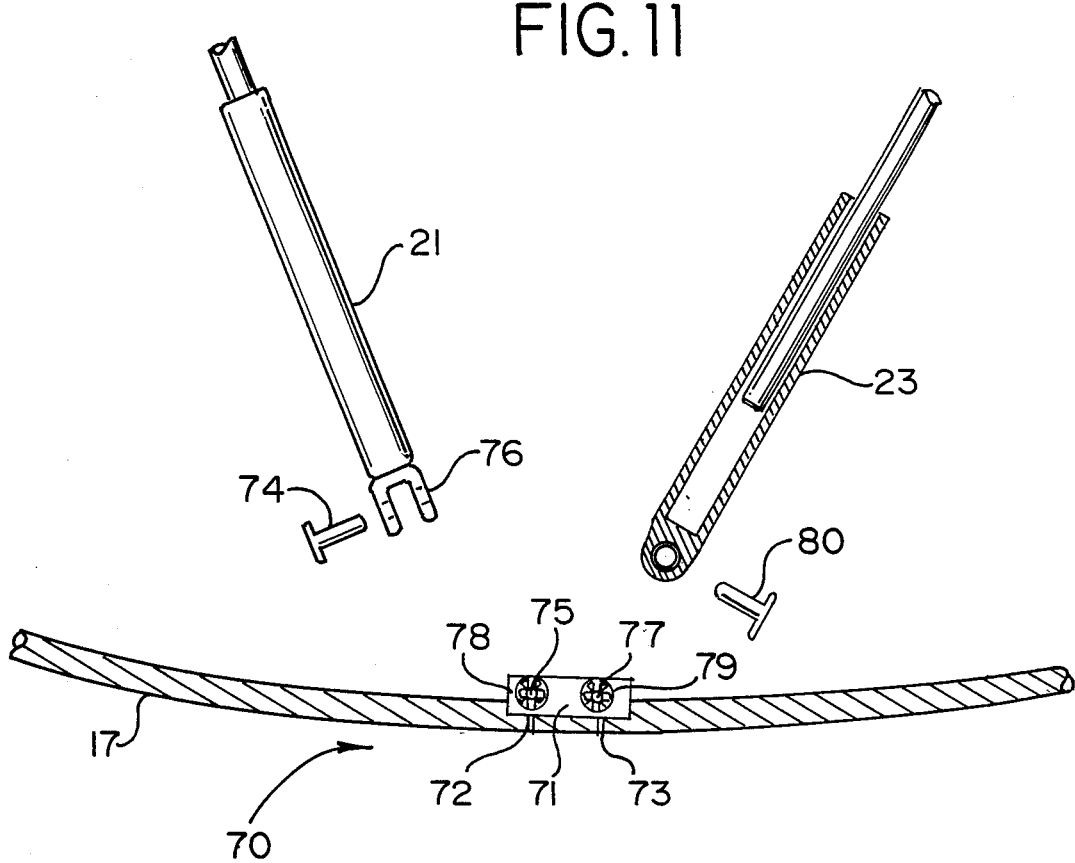
FIG. 11 shows an exploded side view of a portion of a structure of the present invention.

With reference to FIGS. 1 and 11, the manner of interconnection of the telescoping support 21 and 23 to the lower cable 17 is shown. As shown, an attachment member 70 is strapped about the cable 17 through strap connectors 72, 73 and includes a body 71 having opening 75, 77 in which bearings 78, 79 are received.

In the example of the support 21, a pin 74 will extend through openings formed in forked member 76 as well as through the opening 75 in the member 71 to thereby pivotally support the support member 21 on the device 70. The pin 80 correspondingly mounts the fork end 81 of the support 23 with respect to the opening 77 and bearing 79.

Figure 12:
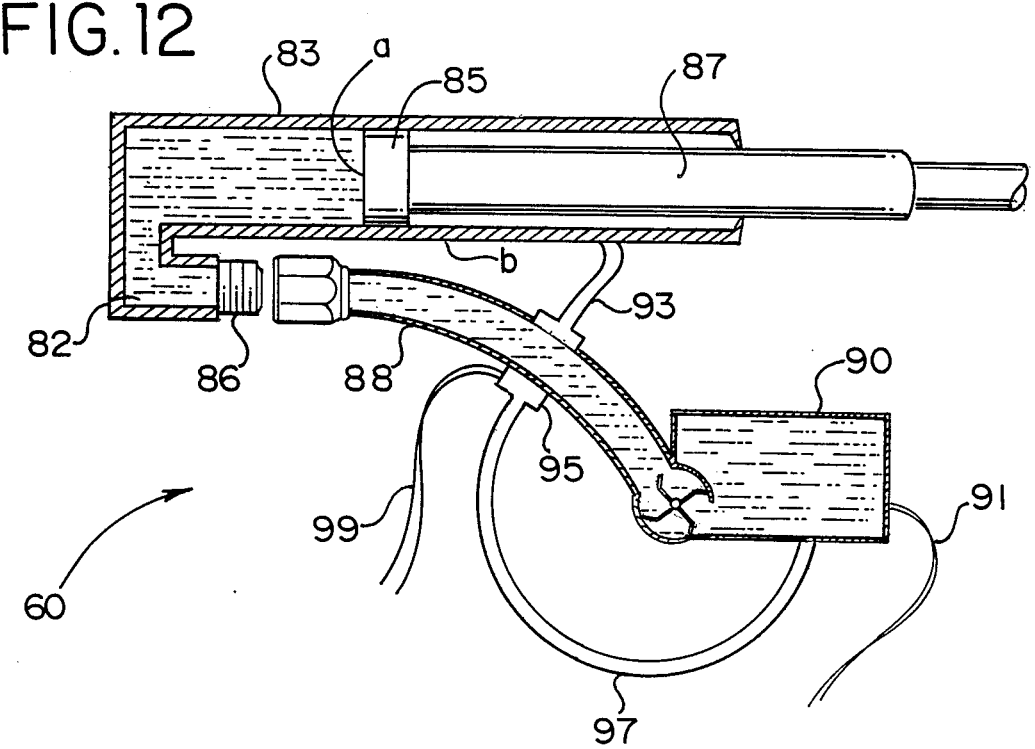
FIG. 12 shows a partially exploded cross-sectional view of a portion of the hydraulic system of the present invention.

FIG. 12 shows a schematic representation of one of the many hydraulic rams 60 forming a part of the present invention. As shown in FIG. 12, a cylinder 83 has a piston 85 slidingly contained therein and having attached thereto a piston rod 87. Hydraulic fluid 82 within the cylinder 83 fluidly communicates to coupling 86 which has attached thereto hydraulic hose 88 which fluidly communicates with a positive displacement pump 90 controlled through the control signals sent thereto by electrical conductor 91.

A further conduit 93 may fluidly supply hydraulic fluid to the side of the cylinder 83 o the side of the piston 85 remote from the coupling 86. A four port reversing valve 95 may be provided to allow reversal of the various connections in the hydraulic system. Thus, a return line 97 may extend from the valve 95 back to the sump of the pump 90. Thus, through manipulation of the valve 95 remotely by virtue of the electrical conductor 99 connected to a solenoid (not shown) for the valve 95 fluid pumped by the pump 90 may in one valve position flow through the conduit 88 into the cylinder 83 on the side a of the piston 85 to move the piston and the rod 87 in the right hand direction in the figure, thus causing fluid to be pumped out from the side b of the piston 85 and into the conduit 93 and thence to the return line 97. Through manipulation of the valve 95 to another position thereof, these flow paths may be altered so that fluid from the pump 90 may go through the conduit 93 and thence onto the side b of the piston 85 thereby moving the piston 85 in the left hand direction as shown in FIG. 12, allowing fluid in the conduit 88 and on the side a of the piston to be exhausted via the valve 95 and the return passage 97. In this way, control of a position of the piston 85 and thereby the rod 87 may easily be controlled.

Figure 13:
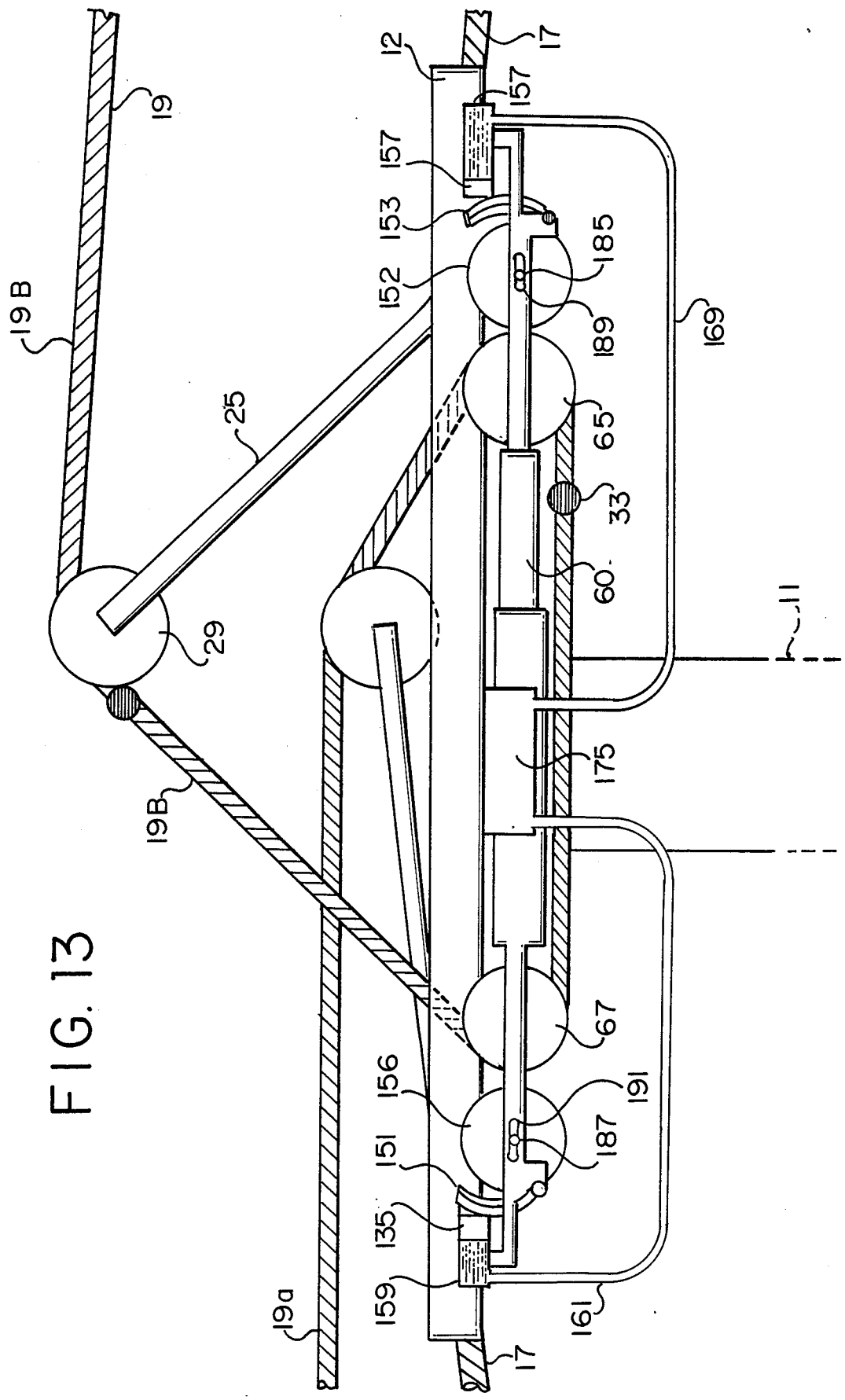
FIGS. 13 and 14 show various details of the breaking mechanism of the present invention.
Figure 14:
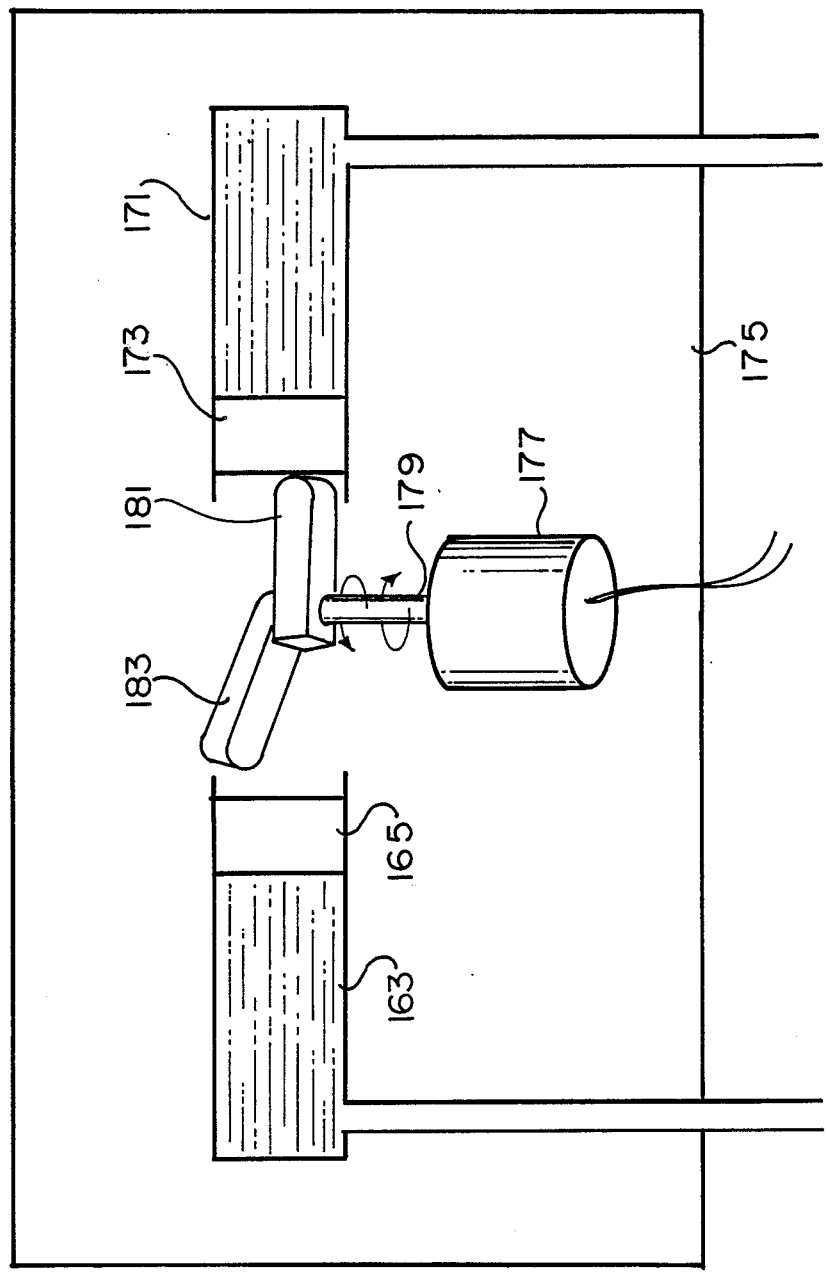

FIGS. 13 and 14 depict various aspects of a brake mechanism which may be utilized in conjunction with the ram 60. With reference to FIGS. 13 and 14, it is seen that brake shoes 151, 153 may be moved by respective piston actuators 155 and 157. The piston 155 is mounted within a cylinder 159 connected by a hydraulic fluid line 161 with a further cylinder 163 (FIG. 14) having a piston 165 slidably mounted therein. In a similar fashion, the piston 157 is slidably mounted in a cylinder 167 which is fluidly connected via hydraulic fluid line 169 with a further cylinder 171 having a piston 173 mounted therein. The structure seen in FIG. 14 is mounted within a housing 175 seen in FIG. 13. The housing 175 contains the piston cylinder 173, 171 as well as the piston cylinder 165, 163. Furthermore, the housing 175 contains an electric motor 177 having a shaft 179 having connected thereto cam members 181, 183. The cam 181 is designed in certain positions of the shaft 179 to move the piston 173 in the right hand direction thus causing movement in the left hand direction in FIG. 13 of the piston 157 to activate the brake shoe 153 into engagement against the pulley to brake cable 19". Similarly, the cam 183 is designed, in certain positions thereof, to engage the piston 165 thereby causing fluid pressurization in the cylinder 163, hydraulic line 161 and cylinder 159 thus causing the piston 155 to engage the brake shoe 151 to cause the brake shoe to engage the wheel 156 thereby causing braking effect on cable 19. In further explanation, the cable 19 is seen in FIG. 13 to be extending between the wheels 67, 65 (See also FIG. 7). The wheels 152, 156 have respective pivots 185, 187 which are slidably contained within slots 189, 191. Thus, movements of the pistons 155, 157 will cause corresponding pivoting of the respective pivoted shoes 151, 153 to engage the respective wheels 156, 152 to allow their respective axles 187, 185 to slide along their respective slots 191, 189 to engage the respective wheels 67, 65 to pinch the cable 19. As should be understood, only one of these braking mechanisms is activated at any given time.

As should be understood, under the control of the controller 200 which will be described in greater detail hereinafter, coordination is carried out between extending and retracting movement of the ram 60 and application of the braking mechanism illustrated in FIGS. 13 and 14 to accomplish adjustments in the angle of the cable 19 with respect to the associated ground surface. Thus, with reference to FIG. 17, when taken in conjunction with FIGS. 1 and 2, and 13 when it is desired to elevate the cable 19 to the angular position illustrated in FIGS. 1 and 2, control signals must be emitted from the controller 200 to cause the ram 60 to retract, while simultaneously, the motor 177 is rotated as described above to cause activation of the shoe 153 to pinch the wheel 152 against the wheel 65. No such braking action is carried out between the wheels 156, 67 so the cable 19' is free to rotate with respect to the wheel 67. Concurrently, the ram 60' is extended with braking action being effected on the wheel 67' thus allowing the expanding movement of the ram 60' to pull the cable 19 over the wheel 65' thereby allowing the protrusion 33 (FIG. 13) to pull the support 25 upwardly to the position shown in FIGS. 1 and 13 in particular.

When it is desired to orient the cable 19 with a slope in the reverse direction to the direction shown in FIGS. 1-3 and 13, opposite actions of the braking mechanisms and rams are carried out as should now be understood by those skilled in the art.

Figure 17:
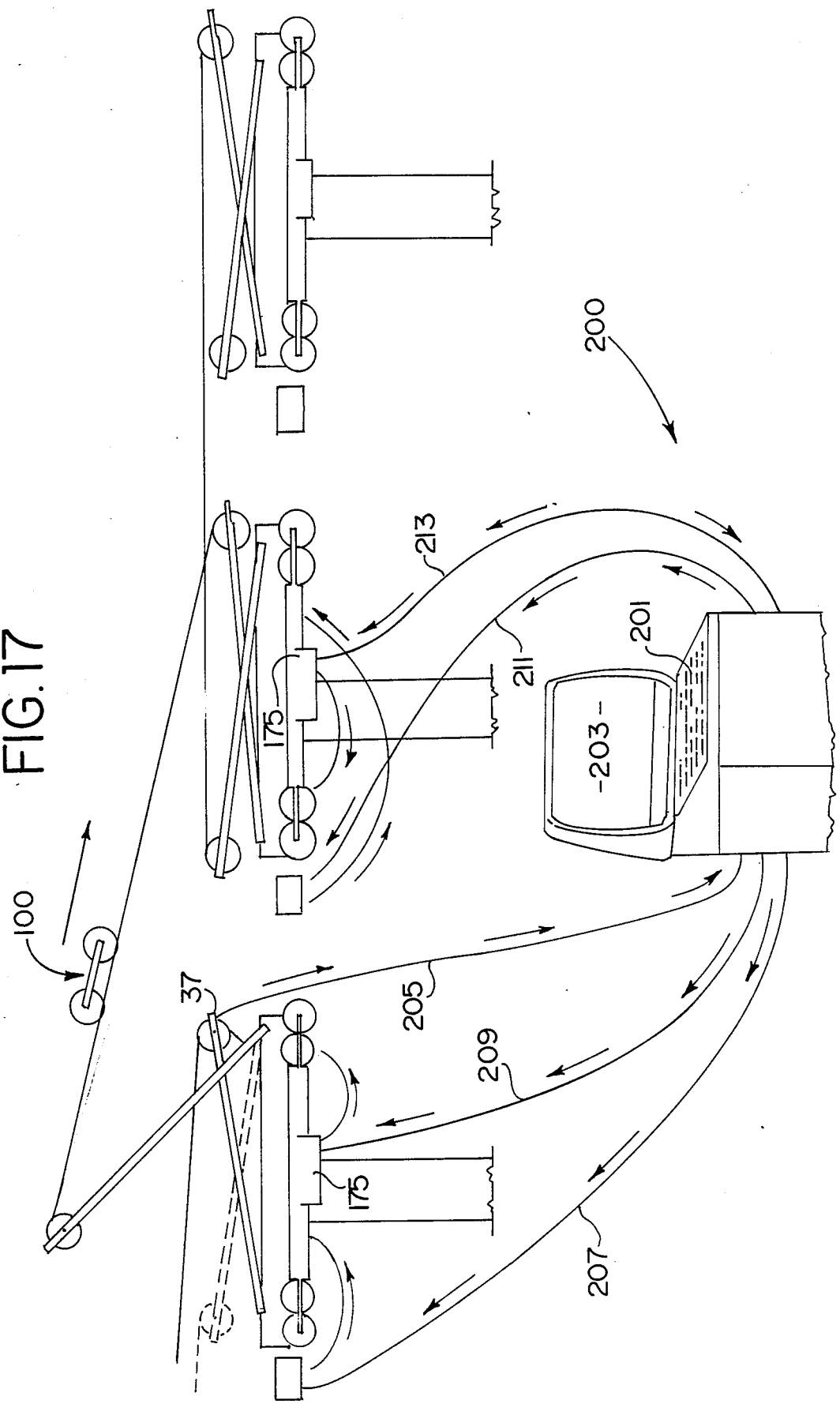
FIG. 17 shows a schematic representation of the manner of control of the present invention.

FIG. 17 schematically depicts a preferred manner of control of the present invention. A computer 200 having a key board 201 and a display screen 203 is provided and receives control signals from the sensors 37 indicative of the position of the vehicle 100. These signals travel down the electrical conductors 205 to an input of the computer 200. Responsive to sensing of these signals, control signals are emitted by the computer 200 in a manner well known to those skilled in the art via the electrical conductors 207, 209, 211 and 213 thereby controlling activation of the various hydraulic rams 60 as well as the motor 177 with its rams 165, 173. Control is also carried out with respect to the structure illustrated in FIG. 21. These actions facilitate alterations in the configuration of the cables 17, 19 to cause the inventive system 10 to be inclined in a direction resulting in movement of the vehicle in a desired direction.

As such an invention has been disclosed in terms of preferred embodiments thereof which fulfill each and every one of the objects of the invention as set forth hereinabove and provide a new and improved automated transportation system of great utility and novelty. Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. An automated transportation system, comprising:
   (a) a first support defining a first station and a second support defining a second station;
   (b) a flexible cable extending from said first station to said second station and beyond said second station with respect to said first station;
   (c) said cable having laterally spaced sections at each station defining a transfer location;
   (d) a vehicle having pulley means for supporting said vehicle on said cable;
   (e) adjustment means for adjusting the angle of ascent or descent of said cable in a particular direction; and
   (f) said pulley means comprising first and second pulleys spaced from one another by a lateral spacing corresponding to the spacing of said laterally spaced sections of said cable whereby one of said pulleys engages said cable before said vehicle arrives at a said transfer location and the other of said pulleys is engaged with said cable at said transfer location.

2. The invention of claim 1, wherein a multiplicity of third supports are provided between said first and second supports.

3. The invention of claim 2, wherein said flexible cable comprises a first upper cable, and further comprising a second lower cable supported by said third supports.

4. The invention of claim 3, wherein said vehicle includes a third pulley guided by an underside of said second cable.

5. The invention of claim 1, wherein said adjustment means comprises:
   (a) an expansible and contractible ram having a piston slidably received in a cylinder and a rod attached to said piston;
   (b) a third pulley mounted on said cylinder remote from said piston and a fourth pulley mounted on said piston rod remote from said piston;
   (c) a pivoting support having a pivot at one end and a fifth pulley at another end;
   (d) said cable being in engagement with said third, fourth and fifth pulleys to form a generally triangular configuration;
   (e) whereby expansions and contractions of said ram control pivoting movements of said pivoting support from a position lying generally parallel with said cable to a generally upright position.

6. The invention of claim 5, wherein said pivoting support includes an upstanding portion adjacent said fifth pulley, said cable including a protrusion adapted to engage said upstanding portion during movement of said ram to cause pivoting movement of said pivoting support.

7. The invention of claim 3, further including first and second telescoping supports connected between said first and second cables and extendable from a first retracted configuration to a second extended configuration and vice versa.

8. The invention of claim 7, wherein each of said telescoping supports includes two telescoping tubes, each of said telescoping supports being adapted to support said upper cable only in said first retracted configuration.

9. The invention of claim 5, wherein said adjustment means further includes a brake mechanism operative to brake said cable at either said third or fourth pulley.

10. The invention of claim 1, wherein said flexible cable has at least one portion thereof having a plurality of teeth, at least one of said first and second pulleys having tooth recesses adapted to receive said teeth.

11. The invention of claim 1, wherein said vehicle includes a generator electrically connected to electrical storage means said generator being operatively coupled to said pulley means.

12. The invention of claim 2, further including sensor means for sensing the location and speed of said vehicle.

13. The invention of claim 8, further including sensor means adjacent said upstanding portion adjacent said fifth pulley for sensing the location and the speed of said vehicle.

14. The invention of claim 13, further including a controller adapted to receive signals from said sensor means indicative of the location and speed of said vehicle and, responsive thereto, to emit control signals to control said ram.

15. The invention of claim 14, wherein said adjustment means includes a brake mechanism operative by said controller to brake said cable at either said third or fourth pulley.

16. The invention of claim 10, wherein said toothed portion of said cable comprises a toothed rail swingable into adjacency with said cable and configured to rotatably receive one of said first or second pulleys.

17. The invention of claim 4, wherein said third pulley is resiliently biased into engagement with said underside of said second cable.

18. The invention of claim 1, wherein said flexible cable is provided with straightening means supporting it all along its path regardless of the distance separating said first station from said second station and beyond said second station.

19. The invention of claim 18, wherein said straightening means comprises at least a first and second telescopic supporting means connected between said first and second cables and extendable from a first retracted configuration to a second extended configuration and vice versa.

20. The invention of claim 19, wherein each of said telescopic supporting means includes two telescoping tubes, each of said telescopic supporting means being adapted to support said upper cable only in said first retracted configuration.

21. The invention of claim 1, wherein means for intercepting the movement of said vehicle is provided, thus permitting differing orientation of said vehicle.

22. The invention of claim 21, wherein said interception of said cable means comprises a rail swingable into adjacency with said cable and configured to rotatably receive one of said first or second pulleys.

23. An automated transportation system, comprising:
(a) a first support defining a first station and a second support defining a second station;
(b) a flexible cable extending from said first station to said second station and beyond said second station with respect to said first station;
(c) said cable having spaced sections and said spaced cable sections including adjacent ends;
(d) a vehicle having pulley means for supporting said vehicle on said cable said vehicle being alternatively supported by each of said cable sections;
(e) adjustment means for separately adjusting the ascent or descent of each of the adjacent ends of said cable sections in a particular direction; and
(f) tensioning means in each of said sections for maintaining a desired tautness of said cable.

24. The invention of claim 23, wherein said tensioning means comprises an expandible and contractable ram.

25. An automated transportation system, comprising:
(a) a first support defining a first station and a second support defining a second station;
(b) a flexible cable extending from said first station to said second station and beyond said second station with respect to said first station;
(c) said cable consisting of at least two cable sections closely spaced from one another at a transfer location and said cable sections including adjacent ends;
(d) adjustment means for separately adjusting the ascent or descent of each of the adjacent ends of said cable sections in a particular direction; and
(e) a vehicle having pulley means for supporting said vehicle on said cable, said vehicle being alternatively supported by each of said cable sections.

26. The invention of claim 25, wherein said vehicle includes means for facilitating transfer of said vehicle from one of said cable sections to an adjacent one of said cable sections.

27. An automated transportation system, comprising:
(a) a first support defining a first station and a second support defining a second station;
(b) a flexible cable extending from said first station to said second station;
(c) adjustment means for adjusting the angle of ascent or descent of said cable in a particular direction; and
(d) tensioning means for maintaining a desired tautness in said cable wherein said adjustment means and tensioning means includes expandable and contractible ram means operable for adjusting angle of ascent or descent of said cable as well as tautness thereof.

28. An automated transportation system, comprising:
(a) a first support defining a first station and a second support defining a second station;
(b) a flexible cable extending from said first station to said second station;
(c) a vehicle and means for supporting said vehicle on said cable;
(d) adjustment means for adjusting the angle of ascent or descent of said cable in a particular direction;
(e) supporting means for supporting said cable between said first and second supports, said supporting means including at least one telescoping support wherein said flexible cable comprises an upper flexible cable and further comprising a lower flexible cable supporting said supporting means.

29. The invention of claim 28, wherein said at least one telescoping support comprises two hollow tubes with one of said tubes telescoping within another of said tubes, said tubes being adjustable between a retracted configuration and an extended configuration, said telescoping support supporting said cable in said retracted configuration.

30. The invention of claim 28, wherein said supporting means is pivotably mounted on said lower cable.

31. The invention of claim 28, further including a further telescoping support, said telescoping support and further telescoping support being pivotably mounted to said lower cable adjacent one another and being attached to said upper cable in spaced relation.

* * * * *